(No Model.)
W. R. CHURCH.
ROAD CART.
No. 355,060. Patented Dec. 28, 1886.
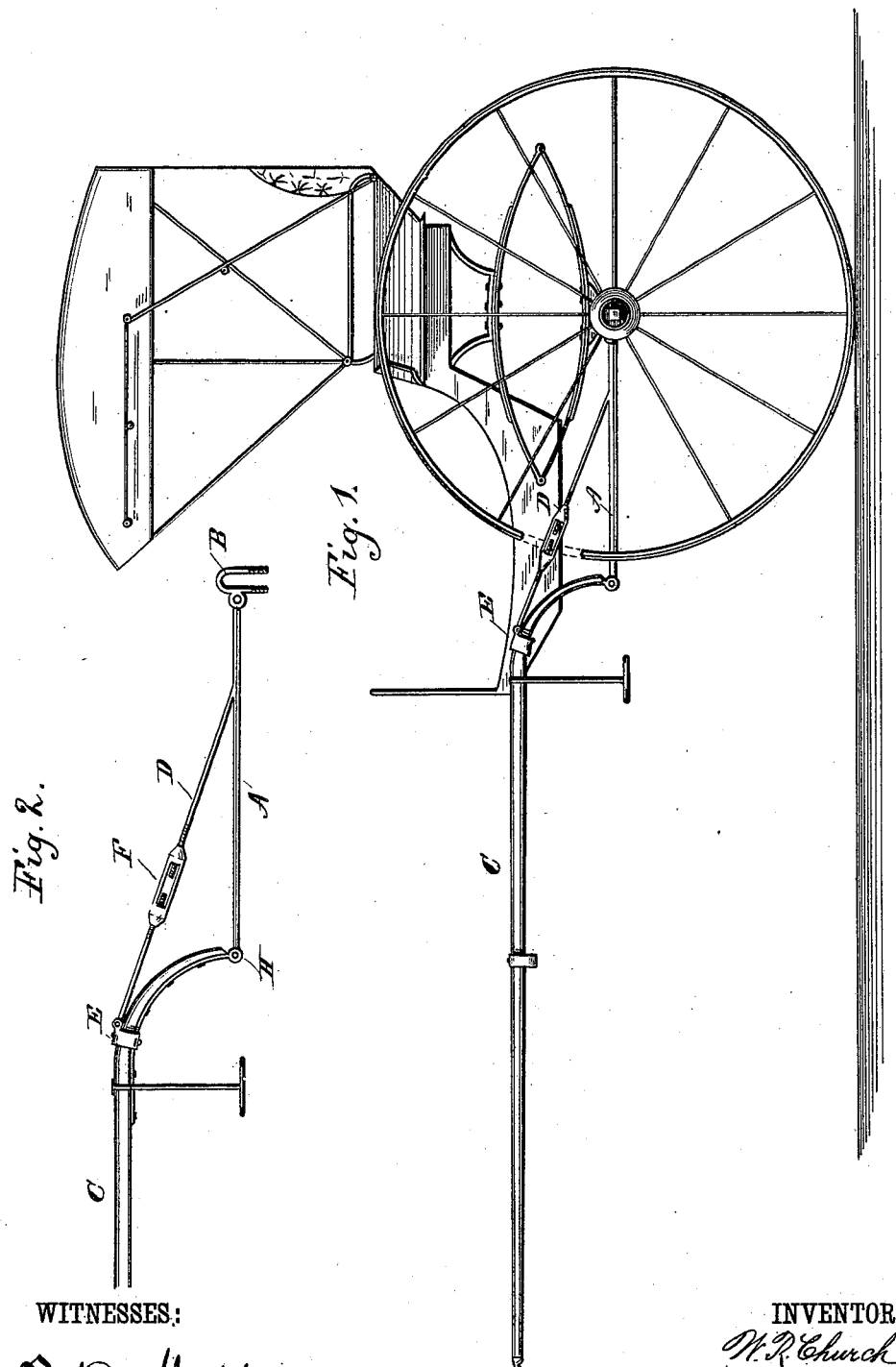
WITNESSES:
D. D. Mott
C. Sedgwick
INVENTOR:
W. R. Church
BY Munn & Co.
ATTORNEYS.

UNITED STATES PATENT OFFICE.

WILLIAM R. CHURCH, OF YORKVILLE, ILLINOIS.

ROAD-CART.

SPECIFICATION forming part of Letters Patent No. 355,060, dated December 28, 1886.

Application filed April 2, 1886. Serial No. 197,545. (No model.)

*To all whom it may concern:*

Be it known that I, WILLIAM R. CHURCH, of Yorkville, in the county of Kendall and State of Illinois, have invented a new and Improved Shaft-Coupling for Road-Carts, of which the following is a full, clear, and exact description.

The object of my invention is to provide an attachment for road-carts whereby the shafts may be raised or lowered to suit the height of the horse, in order that the weight of the load may be properly balanced or adjusted.

Reference is to be had to the accompanying drawings, forming a part of this specification, in which similar letters of reference indicate corresponding parts in both the figures.

Figure 1 is a side view of the road-cart provided with my improved form of shaft-coupling; and Fig. 2 is a detail view illustrating the coupling removed from the vehicle.

The attachment consists, essentially, of a forwardingly-extending bar, A, which is secured to the axle of the vehicle by a clip, B, two of such bars being employed, one being arranged upon either side of the vehicle-body. The shafts C are coupled to the forward ends of the bars A, and their relative position to the wagon-body defined by means of brace-rods D, the forward ends of which are secured by clips E to the shafts, while the rear ends are fixed to the bars A. The bars D are made in two sections, the said sections being united by a turn-buckle, F, of any ordinary construction.

Such being the general arrangement of the coupling attachment, it will readily be appreciated that the relative position of the shafts and vehicle-body may be changed by the turning of the turn-buckle F, connection between the rods A and the shafts being a pivoted connection, as shown in Fig. 2. The adjustment may be made without the necessity of leaving the vehicle.

Not only does the attachment described result in producing a very convenient connection between the shafts and the vehicle, but the appearance of the vehicle is improved, as is also its strength, and after the shafts have been disconnected the parts will not take up as much space, and consequently may be shipped at much lower rates.

Having thus fully described my invention, what I claim as new, and desire to secure by Letters Patent, is—

A shaft-coupling consisting of rods to which the thills are to be pivoted, having clips at their rear ends, and sectional braces connected by a turn-buckle, the forward sections of the said braces being pivoted to the thills and the rear sections rigidly secured to the rods, substantially as herein shown and described.

WILLIAM R. CHURCH.

Witnesses:
ELBERT C. SHIBLEY,
FRANKLIN M. HOBBS.